March 24, 1970     R. C. FERGASON     3,501,903
COTTON HARVESTER STRIPPER BAR
Filed Aug. 10, 1967     3 Sheets-Sheet 3
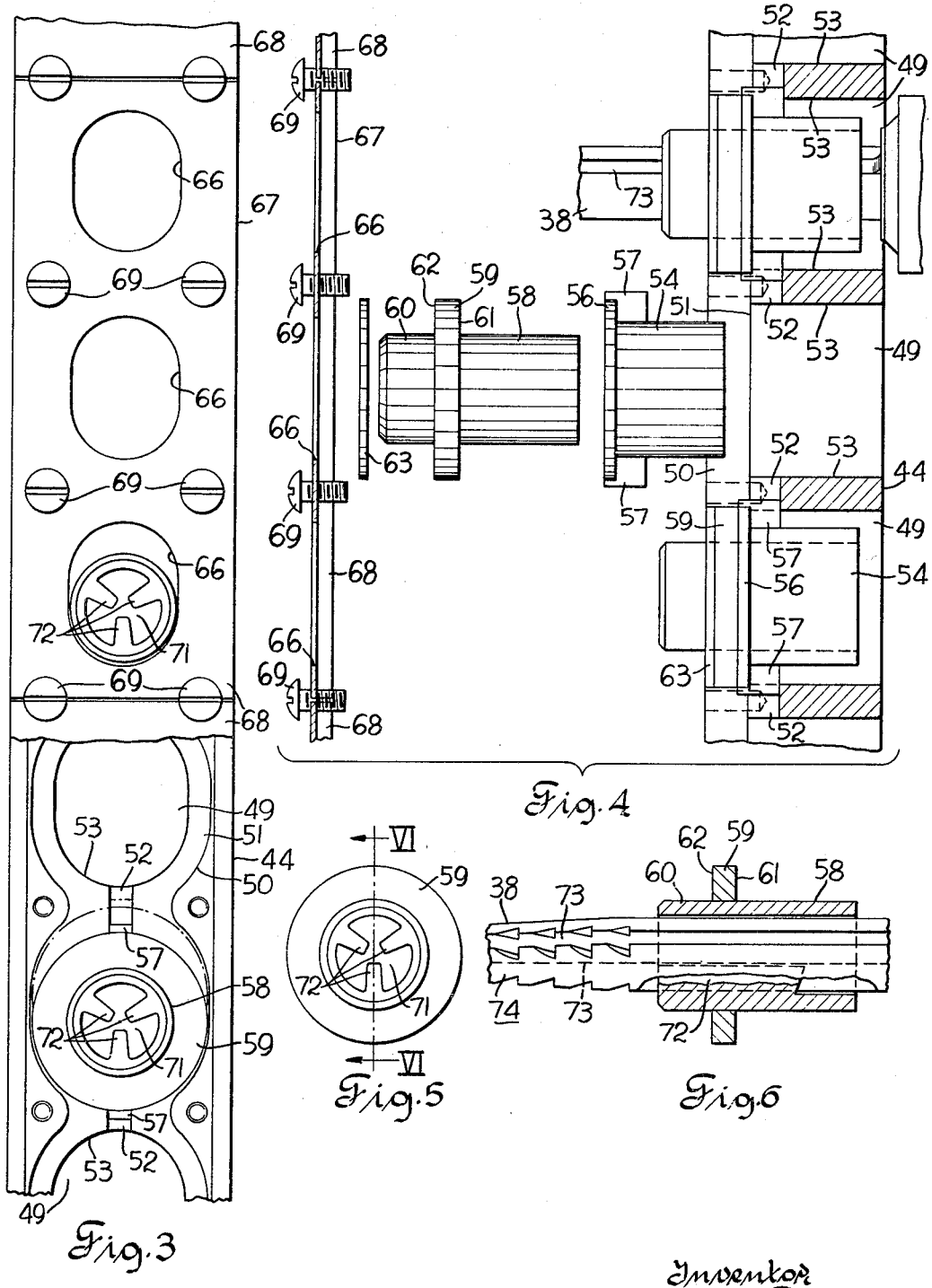
Inventor
Rector R. Fergason
By Kenneth Cluckirk
Attorney

United States Patent Office 3,501,903
Patented Mar. 24, 1970

3,501,903
COTTON HARVESTER STRIPPER BAR
Rector C. Fergason, Gadsden, Ala., assignor to Allis-Chalmers Manufacturing Company, Milwaukee, Wis.
Filed Aug. 10, 1967, Ser. No. 659,637
Int. Cl. A01d 45/18
U.S. Cl. 56—44                    4 Claims

ABSTRACT OF THE DISCLOSURE

A cotton picker stripper bar wherein the stripper bushings are mounted for vertical movement to provide a self-centering function relative to the cotton picker spindles.

---

The present invention relates to a drum type cotton harvester and more particularly to stripper bars with improved stripper bushing mountings.

In the present harvester, cotton is picked from plants by means of a plurality of picking spindles carried by a cylinder or drum which is rotated about a vertical axis. The picking spindles are carried by the drum and are rotated about their principal axis to wind cotton on the spindles. At a point in the rotation of the drum, the stripper bars are moved outwardly along the spindles to push or strip off the cotton wound on the spindles. The stripper bars move inwardly and outwardly of the spindles as controlled by cam tracks which define a path designed to produce such movement. Each of the stripper bars is provided with a rigidly mounted guide finger which forms a guide track on which the stripper bars move inwardly and outwardly as influenced by their contact with the cam tracks. The guide finger serves to support the weight of the stripper bar and also protects the spindles from angular forces resulting from movement of the stripper bar. The guide fingers are rigidly mounted on the upper portion of the drum in alignment with the vertical rows of picking spindles thereby assuring an accurate correlation of the guide fingers vertically with respect to the corresponding vertical row of spindles. The picked cotton is stripped from the spindles by rotating bushings positioned about the spindles and retained in the stripper bar.

Excessive wear and possible breakage of the spindles can occur if misalignment develops between the spindle and the stripping means. Stripper bars in the past have been constructed so that play or clearance is provided between the stripper bushing and the walls of the stripper bar opening in which the bushings are rotatably received. These prior art structures have included self-aligned stripper bushings of this type, however, no provision was made to improve wear life, ease of servicing and sealing against the entry of cotton fiber, dirt and the like. In the present structure, a vertically elongated opening has been provided in the stripper bar which loosely receives a guide of friction reducing material. This guide is keyed to the stripper bar to prevent rotational movement but allowing the guide to move vertically relative to the bar.

A stripper bushing with a thrust collar is driven by the spindle and is rotatably received by the guide with both the guide and bushing being free to move vertically relative to the stripper bar. Thrust is transmitted to the stripper bushing through a flange on the guide contacting a shoulder in the stripper bar opening and by a washer of friction reducing material contacting a cover plate section rigidly secured to the outer face of the stripper bar. In this preferred structure, all of the rotation and thrust is between metal and bearing material to improve the wear life of the component parts and which parts are readily accessible for replacement by merely removing the screws in the cover plate section. The stripper bar opening is adequately sealed against excessive entry of dirt and other foreign material.

It is an object of this invention to provide a cotton harvester with floating stripper bushings.

It is a further object of this invention to provide a cotton harvester wherein stripper bushings are mounted about the picking spindles and are carried in stripper bars which permit the bushings to seek a vertical position as dictated by the coacting spindle.

Further features of invention will become obvious from the following description taken in connection with the accompanying drawings wherein:

FIG. 3 is a side elevation of a cotton harvester slat with some parts removed for clarity of illustration;

FIG. 4 is an exploded view of a portion of a stripper bar and associated parts, portions of which are in section;

FIG. 5 is an end view of a stripper bushing and thrust collar; and

FIG. 6 is a cross sectional view taken on line VI—VI of FIG. 5 showing the internal key of a stripper bushing with a spindle received therein.

Figure 1:
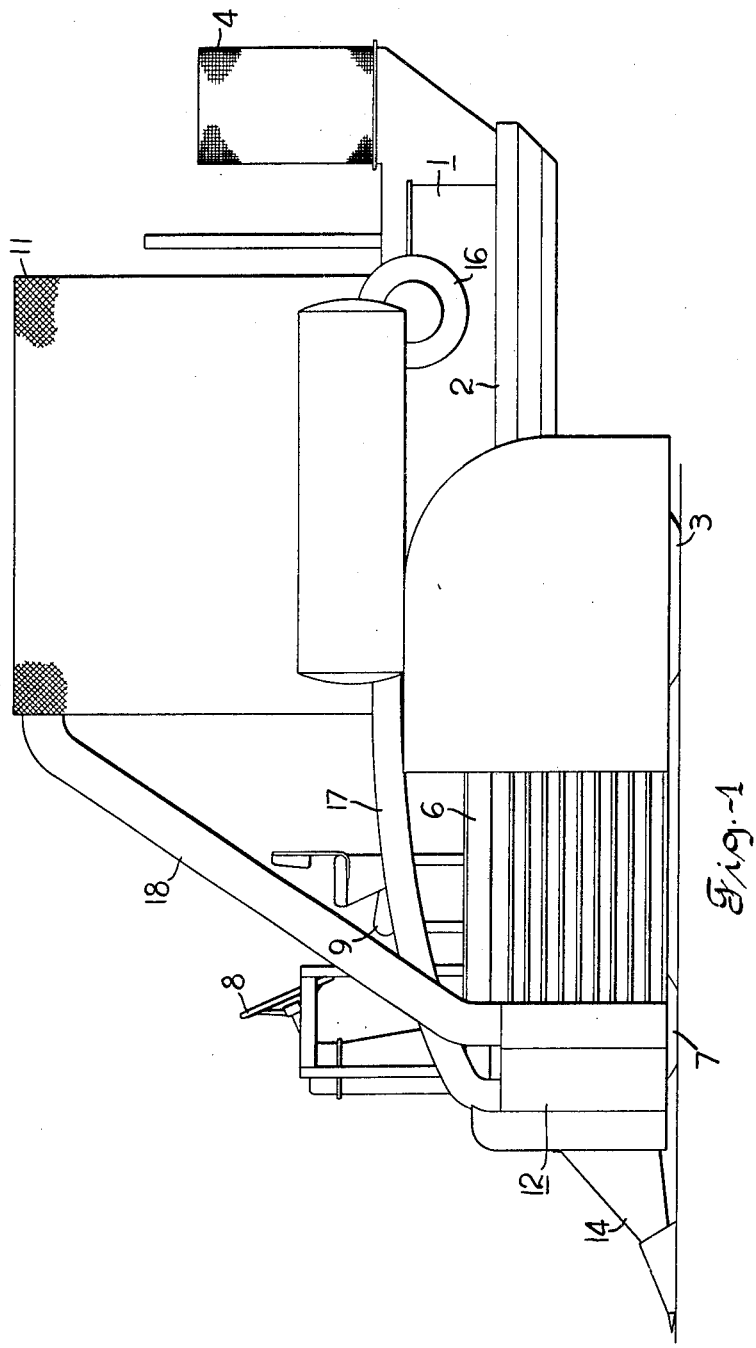
FIG. 1 is a side elevation of a cotton harvester embodying the invention.

Referring to FIG. 1, the cotton harvester embodying the invention consists generally of an engine 1 joined to an axle housing (not shown) and supported thereby as a cantilever beam. A frame member 2 supports engine 1 from the axle housing. A pair of laterally spaced traction wheels 3 (only one of which is shown) are operatively connected to opposite ends of the axle housing. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried on frame 6 rearwardly of the steering wheel 8. A picked cotton receiving basket 11 is carried on frame members 2 and 6 rearwardly of operator's seat 9. Cotton picker assemblies 12 are mounted on each side of the forward end of frame 6. These assemblies are carried by a subframe 13 (see FIG. 2) which is adjustably connected to frame 6 for vertical movement relative thereto. The forward end of picker assemblies 12 (see FIG. 1) are provided with plant dividers 14 which guide cotton plants into contact with cotton pickers which are positioned just rearwardly of the plant dividers. If further details of the stalk dividers are desired, reference may be had to U.S. patent application Ser. No. 456,399, now Patent 3,380,233 filed May 17, 1965, for Plant Divider for Harvesters. Frame 2 supports a blower 16 which is provided with a duct 17 for delivering pressurized air to picking assembly 12 and to a cotton delivering duct 18 for depositing cotton in basket 11.

Figure 2:
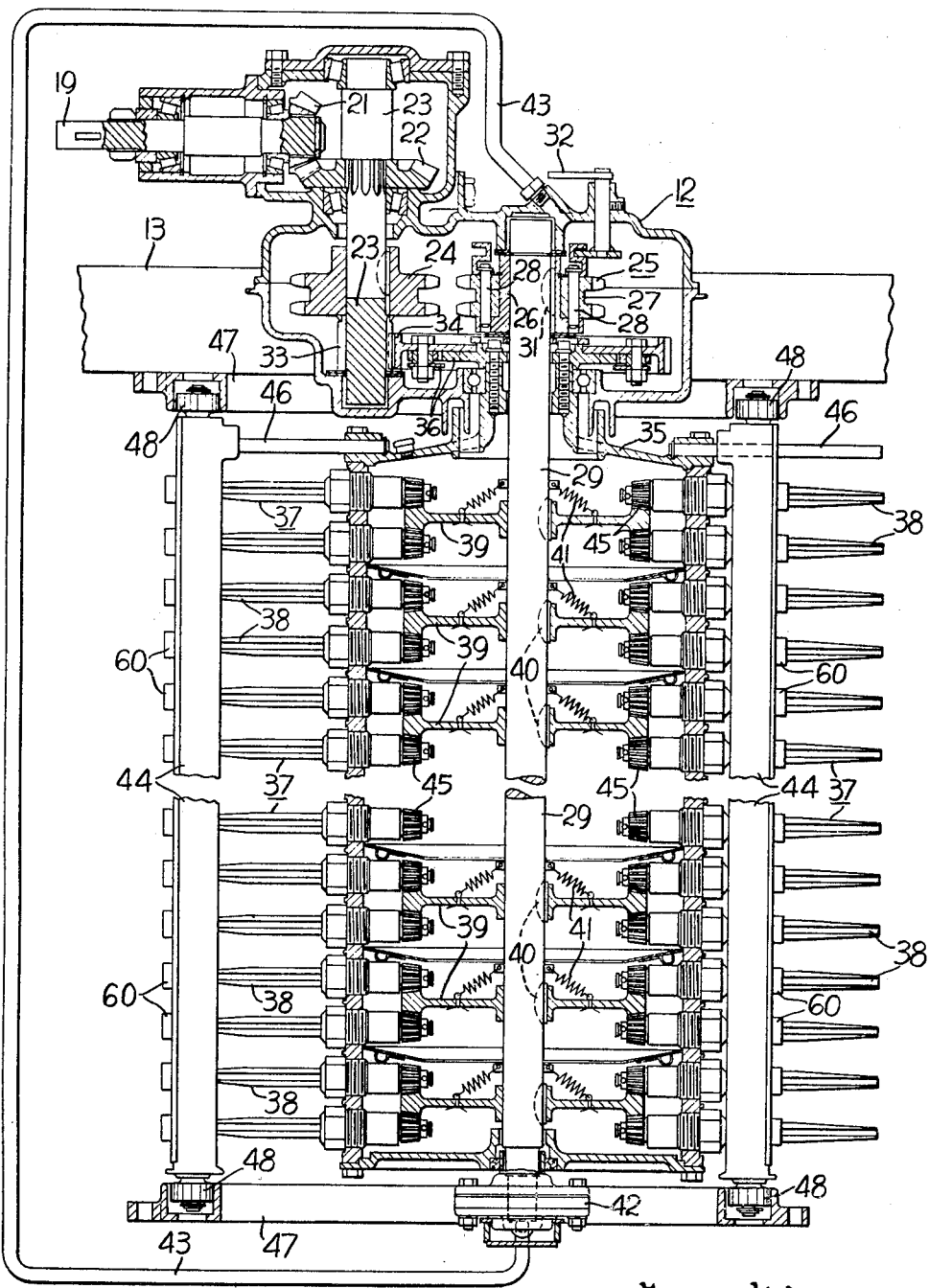
FIG. 2 is a cross sectional view of a drum type cotton harvester embodying the invention showing the power train for driving the drum and picking spindles and showing a vertical row of cotton picking spindles on the right in picking position and on the left in stripped position.

Engine 1 is provided with a power takeoff shaft (not shown) which is operatively connected to shaft 19 of picking unit 12 (see FIG. 2). A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown). Double sprocket 25 includes a center portion 26 upon which the outer portion 27 is journaled. These two portions 26 and 27 are selectively joined together by means of pins 28. Center portion 26 is keyed to shaft 29 for rotation therewith by conventional means such as half-moon key 31. Pins 28 can be raised vertically by raising handle 32 and the mechanism connected therewith to interrupt the driving connection between portions 26 and 27.

Beneath sprocket 24 a gear 33 is formed into shaft 23. Gear 33 is drivingly engaged with a gear 34 which surrounds shaft 29 and which rotates relative thereto. Gear 34 is attached to drum 35 for rotation therewith. A ratchet mechanism 36 is interposed between drum 35 and gear 34 so that drum 35 can only be driven in one direction. If driven in the opposite direction the ratchet mechanism interrupts the drive.

Reference numeral 35 designates the drum or cylinder of a cotton picking machine and which drum carries a plurality of cotton picking spindle assemblies 37. Each picking assembly 37 includes a picking spindle 38. Pairs of horizontal rows of spindles 38 are driven by a double bevel gear 39 secured to drive shaft 29 by means of key 40. Springs 41 suspend gears 39 from shaft 29 and half-moon keys 40 permit gears 39 to be self-aligning. By not having the weight of gears 39 supported on the lower of the pairs of spindles contacted thereby, backlash problems in the gears are eliminated.

The spindle assembly 37 includes a picking spindle 38 which is journaled in drum 35. A gear 45 is pinned to the after end of each spindle for driving same from bevel gear 39. Oil for the lubrication of the gears and bearing in drum 35 is furnished by pump 42 which pumps oil through conduit 43 to the upper portion of the drum and thereafter permitting the oil to return to the pump by the action of gravity and lubricating the gears and bearings during its return trip. The impeller of pump 42 is operatively connected to the lower end of shaft 29 for rotation therewith. A stripper bar 44 is associated with each vertical row of spindles on the drum and these stripper bars are supported from the drum by means of radial and horizontal extending rods 46 upon which the slats 44 are slidably mounted. A pair of vertically spaced stationary cam tracks 47 carried by means of frame 13 at the upper end and by means (not shown) connected to frame 13 at the lower end are arranged to receive cam following rollers 48 carried by the ends of stripper bars 44 to cause movement of the stripper bars longitudinally of the spindles during rotation of the drum. The spindle slat on the left of FIG. 2 has been moved outwardly to a stripping position whereas the spindle slat on the right has been moved inwardly to a cotton picking position.

Each of the spindles 38 projects through an opening 49 in the stripper bar (see FIG. 4) with the outer portion 50 of the opening being larger in diameter than opening 49 and thereby forming a shoulder 51. A vertical row of slots 52 connect openings 49.

Openings 49 are vertically elongated (see FIG. 3) and are provided with circular end walls 53. A plastic tubular guide or bearing member 54 is received by stripper bar opening 49. This guide is formed with an integral outer end flange 56 and a pair of radially extending diametrically oppositely positioned lugs 57. The inner face of the flange 56 contacts the shoulder 51 with the lugs 57 being received in the slots 52. The lugs 57 prevent rotation but permit limited vertical movement relative to the stripper opening 49. A stripper bushing 58 with a breakaway collar 59 positioned in spaced relation to its outer end 60 is rotatably received by the tubular guide 54. The inner thrust surface 61 bears against the guide flange 56 while the outer collar surface 62 rotatably contacts a plastic washer 63. The outer ends 60 of stripper bushings 58 extend through vertically elongated openings 66 in cover plate 67. The cover plate 67 is made up of a series of relatively short end abutting sections 68 which are rigidly secured to the stripper bar 44 by means of cap screws 69. The stripper bushing 58 is provided with a central opening 71 having three equally spaced inwardly projecting tapered ribs 72 which are snugly received by the corresponding grooves 73 in the outer picking portion 74 of the spindles 38.

It should be noted specifically that the present structure consisting of plastic antifriction material surrounding the stripper bushing and presenting wear surfaces on both sides of a single rotating thrust transmitting collar, has greatly increased the wear life of the stripper parts. Removal of eight screws in each cover plate section permits three spindles to be readily serviced thus eliminating the need to remove the entire stripper bar cover plate to service one spindle. No adjustment is required and the plastic guides by extending inwardly a distance equal to the rotating stripper bushing, reduces the possibility of trash collecting at this point. This length stripper bushing and guide provides sufficient alignment with the spindle and extra bearing surface for long life and good dissipation of heat. The diameter of plastic washer 63 is sufficient to seal the elongated opening 66 in the cover plate throughout the vertical range of the stripper bushing thereby protecting the stripper parts against the entry of dust, lint and the like materials.

Referring to FIG. 2, it is to be emphasized that support rods 46 extend horizontally and in vertical alignment with the underlying row of spindles. Hence no transverse alignment of spindles and bushings is required. Referring to FIG. 3, the manner in which the stripper bushings and guides are self-aligning can be readily seen. In the lower part of FIG. 3, bushing 58 and guide 54 are shown in their lowest position of self-adjustment in solid lines. The bushing and guide are shown in their highest position of adjustment in dot and dashed lines. The bushing and guide would be guided vertically from one position to the other or any interventing position by lugs 57 coacting with slots 52. In other words, bushing 58 and guide 54 will take a position in slat 44 somewhere between the full line and dotted line positions shown in FIG. 3, and this position will be determined by the position of the spindle on which the guide and bushing are mounted. From the foregoing it is apparent that a valuable method of compensating for manufacturing inaccuracies has been provided which guaranatees that the spindle and bushing will revolve freely within the guide, and the bushing and guide can be reciprocated upon the spindle without binding.

While in the foregoing a preferred embodiment of the invention has been shown and described, it should be understood that it is not intended to limit the invention to the illustrated details of construction but that the invention includes such other forms and modifications as are embraced in the scope of the appended claims.

The embodiments of the invention in which an exclusive property or privilege is claimed are defined as follows:

1. In a cotton harvester having a frame, a picking cylinder mounted on said frame for rotation about a vertical axis, a plurality of picking spindles radiating horizontally from said cylinder, each of said spindles being journaled in said cylinder, means for rotating said spindles about their horizontal axes, each of said spindles being provided with a picking portion extending from said cylinder, a cotton stripper bushing positioned about each spindle, means providing a driving connection between said stripper and said spindle while permitting longitudinal movement of the stripper along the spindle, a thrust collar positioned about said stripper bushing for movement therewith, a plurality of vertically extending slats carried by said cylinder and adapted to be moved radially during rotation of said cylinder, a vertical row of said stripper bushings being positioned in each of said slats, said slat being provided with a vertical series of horizontally extending apertures therethrough and wherein said apertures each have one portion of a size to receive said bushing and another connecting portion of a size to receive said thrust collar and to permit a limited vertical movement of said bushing and thrust collar, a bearing member rotatably receiving each of said stripper bushings and being mounted in said slat for permitting a limited degree of vertical movement of said bearing, and a cover member is provided for retaining said bearing members in said slats, each of said bearing members being provided with one end portion abutting one side of said thrust collar, and a washer member is positioned between the other side of said thrust member and said cover member.

2. In a cotton harvester as recited in claim 1 and wherein said cover member is provided with an opening through which said stripper bushing extends radially from said cylinder, said opening being oval in shape and having a width equal to the diameter of said bushing and having its length extending in a vertical direction for permitting said bushing to move vertically in said cover for providing self-alignment.

3. In a cotton harvester as recited in claim 4 and wherein said apertures in said slat are oval in shape and said bearing being of a diameter equal to the width of said one portion of said aperture and said thrust collar being of a diameter equal to the width of said connecting portion of said aperture to thereby provide room for vertical adjustment of said bearing and said bushing for self-alignment.

4. In a cotton harvester as recited in claim 1 and wherein said bushing and thrust collar are restrained from horizontal movement relative to said slat but are free floating in a vertical direction so as to conform to the spindle coacting with said bushing and thrust collar.

References Cited

UNITED STATES PATENTS

| | | | |
|---|---|---|---|
| 1,742,493 | 1/1930 | Berry | 56—44 |
| 1,786,851 | 12/1930 | Johnson et al. | 56—47 |
| 1,909,646 | 5/1933 | Wirth | 56—41 |
| 2,302,180 | 11/1942 | Brown et al. | 56—44 |

RUSSELL R. KINSEY, Primary Examiner